(12) United States Patent
Ali et al.

(10) Patent No.: US 10,521,168 B2
(45) Date of Patent: Dec. 31, 2019

(54) ENCRYPTED DOCUMENT PRINTING UTILIZING MULTIPLE NETWORKS

(71) Applicant: Hewlett-Packard Development Company, L.P., Houston, TX (US)

(72) Inventors: Vali Ali, Houston, TX (US); Christopher C Mohrman, Houston, TX (US); Adilson A Mohr, Porto Alegre (BR); Endrigo Nadin Pinheiro, Houston, TX (US); Fabio Riffel, Porto Alegre (BR); Ronaldo Rod Ferreira, Porto Alegre (BR); Jose Paulo Pires, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/088,583

(22) PCT Filed: May 27, 2016

(86) PCT No.: PCT/US2016/034665
§ 371 (c)(1),
(2) Date: Sep. 26, 2018

(87) PCT Pub. No.: WO2017/204827
PCT Pub. Date: Nov. 30, 2017

(65) Prior Publication Data
US 2019/0107982 A1    Apr. 11, 2019

(51) Int. Cl.
*G06F 3/12*        (2006.01)
*H04L 29/06*       (2006.01)
(Continued)

(52) U.S. Cl.
CPC .......... *G06F 3/1238* (2013.01); *G06F 3/1222* (2013.01); *G06F 3/1236* (2013.01);
(Continued)

(58) Field of Classification Search
CPC .... G06F 3/1238; G06F 21/602; G06F 21/608; G06F 3/1236; G06F 3/1222;
(Continued)

(56) References Cited

U.S. PATENT DOCUMENTS 7,576,883 B2    8/2009   Ragnet et al.
9,152,360 B1    10/2015  Reitz et al.
(Continued)

FOREIGN PATENT DOCUMENTS

EP    1855177 A1    11/2007
TW    201411475 A    3/2014
(Continued)

OTHER PUBLICATIONS

Datasheet ~ "Secure Mobile Printing in a Private Cloud" ~ https://www.konicaminolta.eu ~ Oct. 2015 ~ 4 pages.

*Primary Examiner* — Neil R McLean
(74) *Attorney, Agent, or Firm* — HP Inc. Patent Department

(57) ABSTRACT

In one example of the disclosure, an encrypted document and an encryption key for decrypting the encrypted document are received from a computer. Presence data for a printer is received via a first wireless network. A user instruction to print the encrypted document at the printer is received. A credential is received from the printer via the first wireless network, where the credential for communication with the printer via a second wireless network with greater bandwidth than the first wireless network. The encrypted document and the encryption key are sent to the printer, where the printer is to utilize the encryption key to decrypt the encrypted document and is to print the document following decryption.

20 Claims, 10 Drawing Sheets

(51) Int. Cl.
*H04W 4/80* (2018.01)
*G06F 21/60* (2013.01)
*H04N 1/44* (2006.01)
H04L 29/08 (2006.01)
H04W 84/12 (2009.01)

(52) U.S. Cl.
CPC .......... *G06F 3/1292* (2013.01); *G06F 21/602* (2013.01); *G06F 21/608* (2013.01); *H04L 69/14* (2013.01); *H04N 1/4486* (2013.01); *H04W 4/80* (2018.02); *G06F 3/1204* (2013.01); *G06F 3/1226* (2013.01); *H04L 67/12* (2013.01); *H04N 2201/3281* (2013.01); *H04W 84/12* (2013.01)

(58) Field of Classification Search
CPC .... G06F 3/1292; G06F 3/1226; G06F 3/1204; H04N 1/4486; H04N 2201/3281; H04W 4/80; H04W 84/12; H04L 69/14; H04L 67/12
See application file for complete search history.

(56) References Cited

U.S. PATENT DOCUMENTS

| | | | |
|---|---|---|---|
| 2008/0320296 A1* | 12/2008 | Walker | G06F 3/1222 713/150 |
| 2010/0020349 A1* | 1/2010 | Carroll | G06F 3/121 358/1.15 |
| 2012/0127523 A1* | 5/2012 | Terashita | G06F 3/1203 358/1.15 |
| 2013/0081121 A1 | 3/2013 | Green et al. | |
| 2013/0201525 A1* | 8/2013 | Niwa | G06F 3/1236 358/1.15 |
| 2014/0094117 A1 | 4/2014 | Rajendran et al. | |
| 2014/0189351 A1 | 7/2014 | Steely et al. | |
| 2014/0298429 A1 | 10/2014 | Horst et al. | |
| 2015/0009532 A1* | 1/2015 | Tsugimura | G06F 3/1292 358/1.15 |
| 2015/0199157 A1* | 7/2015 | Xiao | G06F 3/1236 358/1.15 |

FOREIGN PATENT DOCUMENTS

TW          201445430 A      12/2014
WO     WO-2015/158425 A1    10/2015

* cited by examiner

ENCRYPTED DOCUMENT PRINTING UTILIZING MULTIPLE NETWORKS

BACKGROUND

Modern information technology enables a user to quickly and easily send an electronic document to another user located on the other side of the world. When the information contained within the document is sensitive, it is often important that the sending user have the ability to restrict access the document such that only the intended recipient, or a group of persons identified as having a legitimate need to access the document, are permitted to do so.

DRAWINGS

FIG. 1 is a block diagram depicting an example environment in which various examples of the disclosure may be implemented.

FIGS. 2A, 2B, and 2C are block diagrams depicting examples of a system for encrypted documents printing utilizing multiple networks.

FIGS. 3A, 3B, and 3C are block diagrams depicting a memory resource and a processing resource to implement examples of a system for printing encrypted documents utilizing multiple networks.

DETAILED DESCRIPTION

Figure 1:
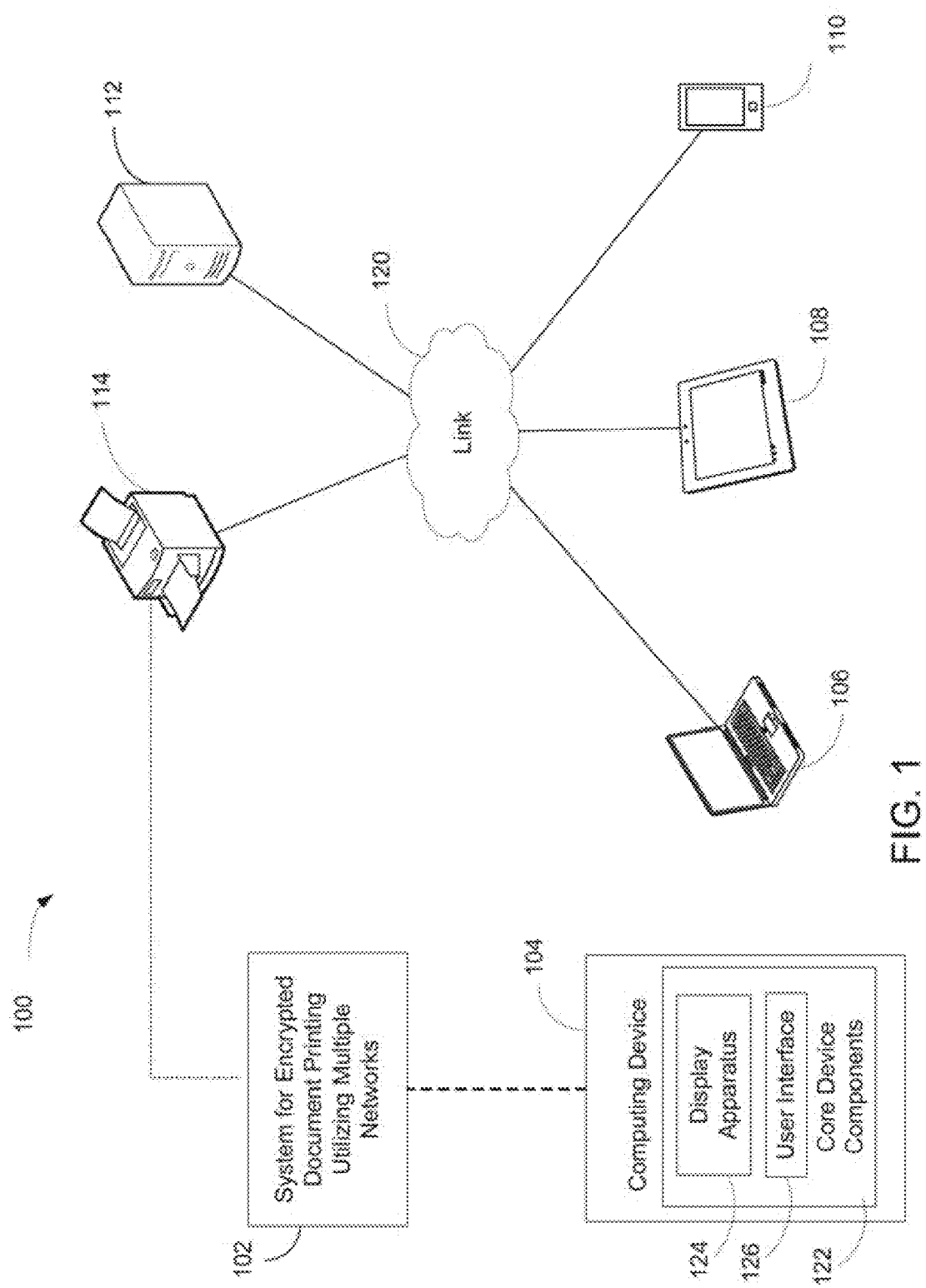

Introduction:

Enterprise computer systems frequently provide access to the internet and to an enterprise intranet that links the enterprise's computers and printers together to support sharing of resources and communications of employees and others with a legitimate need for access. Such enterprise systems often permit authorized users to access the network from a remote location. The complexity of such systems and the need for up-to-date security protocols can require frequent updates and refinements in IT infrastructure and processes. Users can have difficulty in keeping current with such updates and refinements, including but not limited to accurately tracking changes in names and/or IP addresses of known printers. Users may also have difficulty in keeping current with printer names and IP addresses associated with additions, removals, and replacements of printers in the enterprise computer system. Employee users may not be aware of the geographical location of enterprise printers (e.g. location of printers in an office), and may inadvertently dispatch sensitive documents to a distant printer in the enterprise computer system when nearer printer options are available. Further employee users may be limited to printing sensitive documents at printers that are part of the enterprise computers system, limiting mobility and productivity of the users.

To address these issues, various examples described in more detail below provide a secure and user-friendly system and a method for printing encrypted documents by utilizing multiple networks. In one example of the disclosed system, a mobile computing device receives an encrypted document and an encryption key from a computer, wherein the encryption key is for decrypting the encrypted document. The mobile computing device receives presence data for a printer via a first wireless network. The mobile computing device receives a user instruction to print the encrypted document at the printer. The mobile computing device receives a credential from the printer via the first wireless network, and is to communicate with the printer using the credential via a second wireless network that has a greater bandwidth than does the first wireless network. The mobile computing device sends the encrypted document and the encryption key to the printer via the second network. The printer is to in turn utilize the encryption key to decrypt the encrypted document and is to print the encrypted document.

In certain examples, the mobile computing device may be a smartphone or a wearable computing device. In certain examples of the disclosure, the encryption key is a key that is usable to decrypt the encrypted document for a designated time period. In certain examples, the first wireless network is one from the set of a Bluetooth wireless network, a near field communication wireless network, and an infrared wireless network. In certain examples, the second wireless network is an ad hoc Wi-Fi network.

In certain examples, the printer is a first printer, and the mobile computing device is to determine and present a preference order for a set of printers that includes the first printer, the preference order determined based at least in part upon the presence data. In certain examples, the mobile computing device is to determine the preference order based at least in part upon a wireless signal strength associated with the first printer. In certain examples, the mobile computing device is to determine the preference order based at least in part upon a proximity between the mobile computing device and the first printer.

In certain examples of the disclosure, the mobile computing device may receive a credential from the computer via a third wireless network, wherein the mobile computing device is to communicate with the computer using the credential via a fourth wireless network with greater bandwidth than the third wireless network. In this example, the mobile computing device is to receive the encrypted document and the encryption key from the computer via the fourth wireless network with the greater bandwidth.

In another example of the disclosure, a printer is to send to a mobile computing device, via a first wireless network, a credential for the mobile computing device to communicate with the printer via a second wireless network that has a greater bandwidth than does the first wireless network. The printer is to, responsive to receiving the credential from the mobile computing device, establish the second wireless network. The printer is to receive from the mobile computing device, via the second wireless network, an encrypted document and an encryption key for the encrypted document. The printer is to utilize the encryption key to decrypt the encrypted document, and following the decryption is to perform a printing operation to cause output of a printer version of the encrypted document.

In another example of the disclosure, a computer is to encrypt an electronic document utilizing an encryption key. The computer is to send the encrypted document and the encryption key to a mobile computing device. Following receipt of the encrypted document and the encryption key, the mobile computing device is to, upon receipt of a user instruction to print the encrypted document at a detected printer, communicate with the printer, and receive a credential from the printer via a first wireless network. The mobile computing device is to utilize the received credential to communicate with the printer via a second wireless network established by the printer. The second wireless network that was utilized for the printer to send the encrypted document and the encryption key to the mobile computing device is a network with a greater bandwidth than the first wireless network that was utilized as the printer sent the mobile computing device the credential.

In certain examples, the computer may also send to the mobile computing device, via a third wireless network, a credential that enable the computer and the mobile computing device to communicate via the first wireless network. In this example, the first wireless network is a network that has a greater bandwidth than the third wireless network. The computer may then send the encrypted document and the encryption key to the mobile computing device via the higher bandwidth first wireless network.

In this manner, the disclosed examples provide for an efficient and easy to use method and system to securely print encrypted documents utilizing multiple networks. Users of the disclosed system and method will not need to remember printer names and/or IP addresses of the printers in order to send secure print jobs for printing. Additionally, users of the disclosed system and method are enabled to print sensitive documents utilizing an unfamiliar printer, thereby increasing the flexibility of the user to print at locations other than offices of the enterprise. For instance, users may be able to securely print at a hotel, an airport, and other remote locations. Security may be additionally enhanced as the disclosed system and method provide for ordering of available printers based on a distance between the printers and the user's mobile computing device. For at least these reasons, users of mobile computing devices, printers, and computers should each appreciate the significant enhancements in security, flexibility, and increased productivity to be enjoyed with utilization of the disclosed examples.

It should be noted that while the disclosure is sometimes discussed with reference to enterprise computer environment, the teachings of the present disclosure are not so limited. The disclosed examples of encrypted document printing utilizing multiple networks are contemplated for both enterprise and non-enterprise environments.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of reporting computer resource accesses. The fourth section, labeled "Operation," describes implementation of various examples.

Environment:

FIG. 1 depicts an example environment 100 in which examples may be implemented as a system 102 for printing encrypted documents utilizing multiple networks. Environment 100 is shown to include computing device 104, client devices 106, 108, and 110, server device 112, and printer 114. Components 104-114 are interconnected via link 120.

Link 120 represents generally any infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 120 may represent the internet, intranets, and any intermediate routers, switches, and other interfaces. As used herein, a "computing device" may be a server, computer networking device, chip set, desktop computer, notebook computer, workstation, tablet computer, smartphone, printer, or any other processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally any computing device with which a user may interact to communicate with other client devices, server device 112, and/or printer 114 via link 120. Server device 112 represents generally any computing device to serve an application and corresponding data for consumption by components 104-110 and/or 114.

Computing device 104 represents generally any computing device with which a user may interact to communicate with client devices 106-110, server device 112, and/or printer 114 via link 120. Computing device 104 is shown to include core device components 122. Core device components 122 represent generally the hardware and programming for providing the computing functions for which device 104 is designed. Such hardware can include a processor and memory, a display apparatus 124, and a user interface 126. The programming can include an operating system and applications. Display apparatus 124 represents generally any combination of hardware and programming to exhibit or present a message, image, view, or other presentation for perception by a user, and can include, but is not limited to, a visual, tactile or auditory display. In examples, the display apparatus 124 may be or include a monitor, a touchscreen, a projection device, a touch/sensory display device, or a speaker. User interface 126 represents generally any combination of hardware and programming to enable interaction between a user and device 104 such that the user may effect operation or control of device 104. In examples, user interface 126 may be, or include, a keyboard, keypad, or a mouse. In some examples, the functionality of display apparatus 124 and user interface 126 may be combined, as in the case of a touchscreen apparatus that may enable presentation of images at device 104, and that also may enable a user to operate or control functionality of device 104.

Printer 114 represents generally any computing device configured to consume a marking agent to produce a printed job or printed content. Printer 114 includes hardware and programming for providing printing functions. Printer 114 may include an operating system to cause the printer to interpret print data, and a printing element to cause the application of one or more marking agents according to mapping provided by print data. In the case of 2D printing the one or more marking agents may be applied according to the print data mapping to a media and/or to another layer of marking agent previously applied to the media to form an image. In the case of 3D printing the one or more marking agents may be applied according to the print data mapping to a bed of marking agent or other build material, or to a previously applied layer of marking agent or other build material, to thereby form an object.

System 102, discussed in more detail below, represents generally a combination of hardware and programming to provide for encrypted document printing utilizing multiple networks. In some examples, system 102 may be wholly integrated within core device components 122. In other examples, system 102 may be implemented as a component of any of computing device 104, client devices 106-110, server device 112, or printer 114 where it may take action based in part on data received from core device components 122 via link 120. In other examples, system 102 may be distributed across computing device 104, and any of client devices 106-110, server device 112, or printer 114.

Figure 2A:
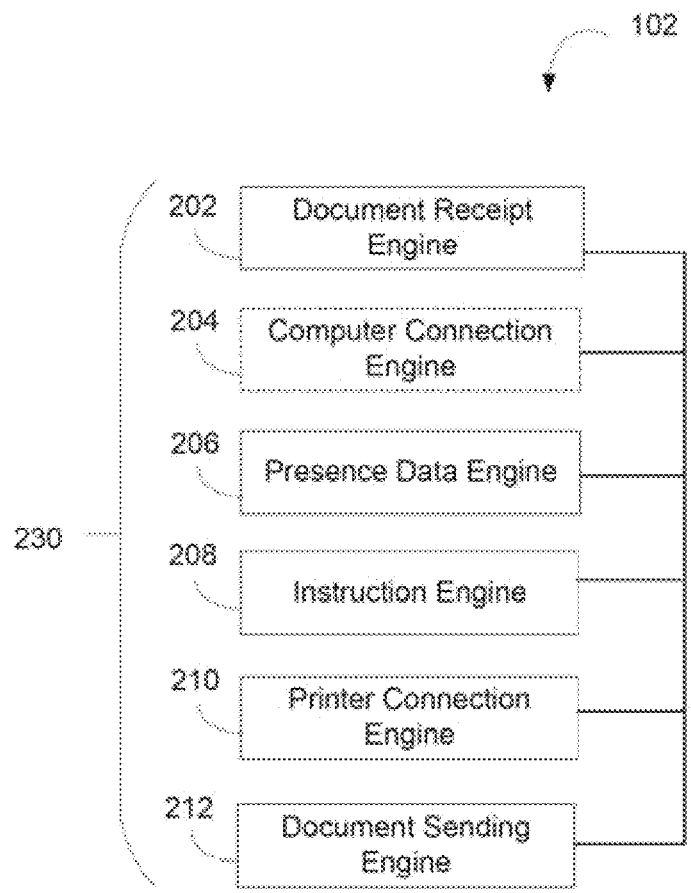
Figure 2B:
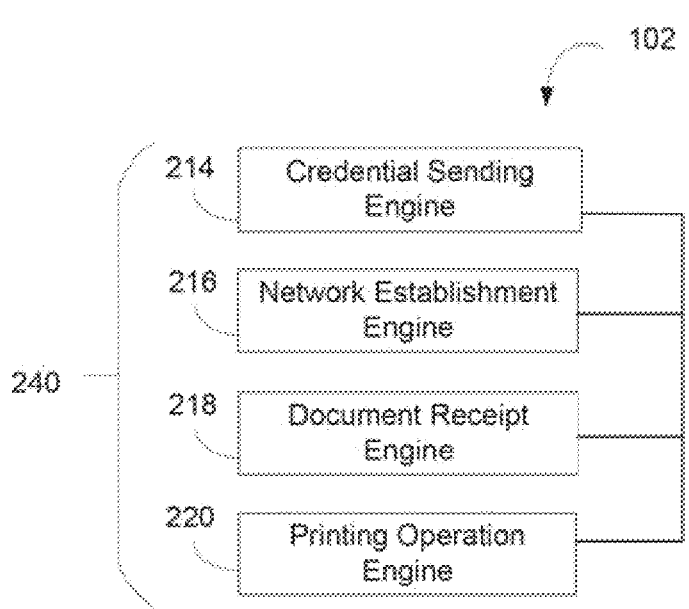
Figure 2C:
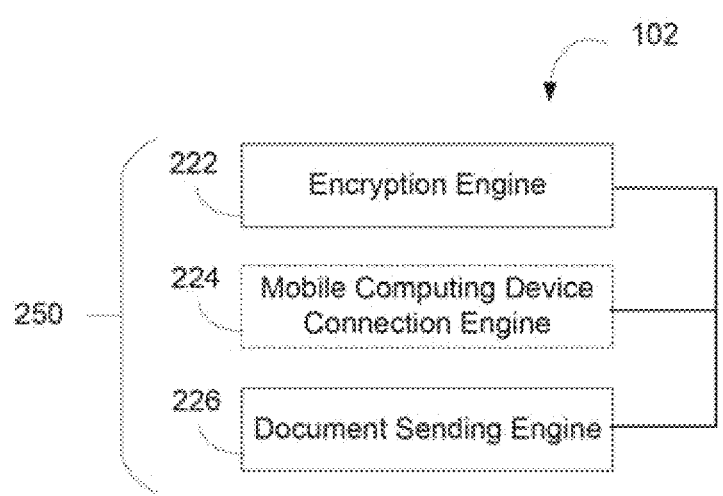

Components:

FIGS. 2A, 2B, 2C, 3A, 3B, and 3C depict examples of physical and logical components for implementing various examples. In FIGS. 2A, 2B, and 2C various components are identified as engines 202, 204, 206, 208, 210, 212, 214, 216, 218, 220, 222, 224, and 226. In describing engines 202-226 focus is on each engine's designated function. However, the term engine, as used herein, refers generally to a combination of hardware and programming to perform a designated function. As is illustrated later with respect to FIGS. 3A, 3B, and 3C, the hardware of each engine, for example, may include one or both of a processor and a memory, while the programming may be code stored on that memory and executable by the processor to perform the designated function.

FIG. 2A is a block diagram depicting components of a system 102 to enable printing of encrypted documents utilizing multiple networks. In the example of FIG. 2A, system 102 may be hosted by a mobile computing device. The terms "mobile computing device" and "mobile device" are used synonymously, and refer generally to any portable computing device, including, but not limited to, a notebook computer, tablet computer, smartphone, and a wearable computing device (e.g., a smartwatch or smart eyeglasses). In this example, system 102 includes document receipt engine 202, computer connection engine 204, presence data engine 206, instruction engine 208, printer connection engine 210, and document sending engine 212. In performing their respective functions, engines 202-212 may access a data repository, e.g., any memory accessible to system 102 that can be used to store and retrieve data.

In an example, document receipt engine 202 represents generally a combination of hardware and programming to receive from a computer an encrypted document and an encryption key for decrypting the encrypted document. As used herein, an "encrypted document" refers generally to a document that has been encoded or processed such a way that an authorized computing device with an associated encryption key can access or read the document. In one example, of encryption, a document may be encrypted using an encryption algorithm, generating ciphertext and/or encrypted images that cannot be read or understood by a human until after decryption with the applicable encryption key. As used herein, "document" is used synonymously with "electronic document", and refers generally to a computer file that provides information or evidence, or that serves as an electronic record, and can be opened with an application. In examples, the document may be a non-executable computer file. As used herein, "application" refers generally to programming that executes at, or accessible at, a computing device to enable a user to perform a group of coordinated functions, tasks, or activities. In examples, an application may be an application that executes at a notebook computer, desktop computer, mobile computing device or other personal computing device. In other examples, an application may be a web application that executes at, or may be a web application accessible, at a personal computer. As used herein, a "web application" refers generally to an application that is coded in a browser-supported language (such as XML, HTML, or HTML with JavaScript) and is reliant on a web browser application to render the application executable or presentable. Examples of web pages that may include or facilitate web applications are webmail pages, online search engine pages, online sale pages, auction sites pages, and wiki pages. In other examples, an application may be a may be a rich client application. As used herein, a "rich client application" refers generally to an application executing in a computing device that that retrieves data via the Internet. As used herein, "computer" is used synonymously with "computing device," may be, but is not limited to, a desktop computer, workstation, mobile computing device, and/or other processing device or equipment.

Presence data engine 206 represents generally a combination of hardware and programming to receive, via a first wireless network, presence data for a printer. As used herein, a "wireless network" refers generally to a computer network established between computing devices via wireless connections, e.g., without direct electrical conductor connectivity between the computing devices. In an example, the first wireless network may be a Bluetooth wireless network. In another example, the first wireless network may be a near field communication wireless network. In another example, the first wireless network may be an infrared wireless network. In another example, the first wireless network may be a form of a wireless personal area network other than a Bluetooth, near field communication, or infrared wireless network.

As used herein, "presence data" refers generally to data indicative of detection of an existence, incidence, or occurrence of a printer. In examples, the presence data may be indicative of a proximity to or distance to the printer. In a particular example, the presence data received by presence data engine 206 may be data sent by the printer via the first wireless network as part of a pinging operation. In another particular example, the presence data received by presence data engine 206 may be data sent by the printer via the first wireless network as part of a handshake operation between the printer and the mobile computing device hosting presence data engine 206.

As used herein, a "printer" is synonymous with a "printing device", and refers generally to any electronic device or group of electronic devices that consume a marking agent to produce a printed print job or printed content. In examples, a printer may be, but is not limited to, a liquid inkjet printer, a solid toner-based printer, a liquid toner-based printer, or a multifunctional device that performs a function such as scanning and/or copying in addition to printing. In certain examples, a "printer" may be a 3D printer. In certain examples, the printed print job or printed content may be a 3D rendering created by a 3D printer printing upon a bed of marking agent or other build material. As used herein, a "print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape.

In certain examples of the disclosure, presence data engine 206 is to receive presence data for each of a set of printers. In these examples, presence data engine 206 may determine a preference order for the set of printers, wherein the preference order prioritizes a first printer among the set of printers based at least in part upon the received presence data. In a particular example, presence data engine 206 is to determine the preference order based at least in part upon a wireless signal strength associated with the first printer and wireless signal strengths associated with the other printers of the set. In another particular example, presence data engine 206 is to determine the preference order based at least in part upon determined distances or other proximities between the mobile computing device and the printers of the set of printers.

Printer connection engine 208 represents generally a combination of hardware and programming to receive a credential from the printer via the first wireless network. As used herein, "credential" refers generally to information, e.g., a password, token, or certificate, that may be issued by a computing device to another computing device. In a particular example, the credential may be a string of characters that, when sent by printer connection engine 208 to the printer, and received by the printer, identifies the mobile computing device as a computing device authorized to communicate with the printer via the second network. In another example, the credential may be a string of characters that, when received by the printer from printer connection engine 208, identifies a communication that includes the string as a communication the printer is authorized to receive.

Printer connection engine 208 is to in turn communicate with the printer using the credential via a second wireless network with greater bandwidth than the first wireless network. As used herein "bandwidth" refers generally to a rate of data transfer or a capacity for data transfer across a network, e.g., a throughput rate or capacity rate that measures an amount of data that can be carried from one point to another in a given time period. In an example, bandwidth may be a bit rate measured in bits of data per second (bit/s). In another example, bandwidth may be a byte rate measured in bytes of data per second (B/s).

In an example, the second wireless network may be an ad hoc wireless network established by the printer. In a particular example, the second wireless network may be an ad hoc Wi-Fi network established by the printer. As used herein, an "ad hoc" network refers generally to a wireless network that does not rely on a pre-existing infrastructure, such as routers in wired networks or access points in managed (infrastructure) wireless networks. In a particular example, an ad hoc network established by the printer for communication with printer connection engine 208 may be a direct wireless connection between the printer and printer connection engine 208.

Document sending engine 212 represents generally a combination of hardware and programming to send the encrypted document and the encryption key to the printer via the second network that has greater bandwidth than the first network. The printer, responsive to receipt of the encrypted document and the encryption key, is to utilize the encryption key to decrypt the encrypted document, and is to print the document following the decryption.

In certain examples, the encryption key may be a key that is usable to decrypt the encrypted document for a designated time period. In one such example, the encryption key may be structured such that the key is usable for decryption of the encrypted document for period of x hours (or weeks, or months, etc.) following a start event. In another such example, the encryption key may be structured such that the key is usable for decryption of the encrypted document for period of y hours (or weeks, or months, etc.) from a start time. In examples, the start time may be an expression of time in terms of a time of day, or may be expressed as a date (e.g., a calendar date). In a particular example, the start time may be a time or date the encryption key was created. In another particular example, the start time may be a time or date that the encryption key was received by the computer that sent the key to document receipt engine 202 of system 102. In yet another particular example, the start time may be a time or date that document receipt engine 202 received the encryption key from the computer.

As noted previously, document receipt engine 202 is to receive from a computer an encrypted document and an encryption key for decrypting the encrypted document. In certain examples of the disclosure, system 102 may additionally include a computer connection engine 204 to facilitate the receipt of the encrypted document and the encryption computer from the computer via a high bandwidth network. Computer connection engine 204 represents generally a combination of hardware and programming to receive a credential from a computer via a third wireless network, wherein computer connection engine 204 is to communicate with the computer using the credential via a fourth wireless network with greater bandwidth than the third wireless network. In examples, document receipt engine may receive the encrypted document and the encryption key from the computer via the higher bandwidth fourth wireless network. In examples, the fourth wireless network may be an ad hoc wireless network that is established by the computer. In a particular example, the fourth wireless network may be an ad hoc Wi-Fi network established by the printer. In a particular example, an ad hoc network established by the computer for communication with computer connection engine 204 may be a direct wireless connection between the computer and computer connection engine 204. In examples, document receipt engine 202 is to receive the encrypted document and the encryption key from the computer via the fourth wireless network that is the higher bandwidth network.

In examples, document receipt engine 202 may receive the encrypted document and the encryption key from the computer, computer connection engine 204 may receive a credential from a computer, presence data engine 206 may receive the presence data, printer connection engine 210 may receive a credential from the printer, and/or document sending engine 212 may send the encrypted document and the encryption key to the printer over a link 120 utilizing a networking protocol. In examples the networking protocols utilized may include, but are not limited to, Transmission Control Protocol/Internet Protocol ("TCP/IP"), HyperText Transfer Protocol ("HTTP"), and and/or Session Initiation Protocol ("SIP").

FIG. 2B is a block diagram depicting components of a system 102 to provide for encrypted document printing utilizing multiple networks. In the example of FIG. 2B, system 102 may be hosted by a printer. In this example, system 102 includes credential sending engine 214, network establishment engine 216, document receipt engine 218, and printing operation engine 220. In performing their respective functions, engines 214-220 may access a data repository, e.g., any memory accessible to system 102 that can be used to store and retrieve data.

In an example, credential sending engine 214 represents generally a combination of hardware and programming to send to a mobile computing device via a first wireless network, a credential for the mobile computing device to communicate with the printer via a second wireless network. In examples, the mobile computing device may be smartphone, a wearable computing device, or any other portable computing device. In a particular example, the first wireless network may be a Bluetooth wireless network. In another particular example, the first wireless network may be a near field communication network. In another particular example, the first wireless network may be an infrared wireless network. In another particular example, the first wireless network may be a form of a wireless personal area network other than a Bluetooth, near field communication, or infrared wireless network.

Network establishment engine 216 represents generally a combination of hardware and programming to, in response to receiving the credential (that was sent by credential sending engine 214 to the mobile computing device) back from the mobile computing device, establish the second wireless network with the higher bandwidth. The second network is a network having a greater bandwidth than does the first wireless network. In examples, the second network is an ad hoc network. In examples, the second network may be may be an ad hoc Wi-Fi network. In a particular example, the second network may be an ad hoc network that is a direct wireless connection between the printer and the mobile computing device.

Document receipt engine 218 represents generally a combination of hardware and programming to receive from the mobile computing device, via the newly established second wireless network, an encrypted document and an encryption key that can be used to decrypt the encrypted document. In certain examples, the encryption key may be a key that is usable to decrypt the encrypted document for a designated time period or for a designated duration, and that is not usable outside the designated time period or designated duration.

Printing operation engine 220 represents generally a combination of hardware and programming to utilize the encryption key to decrypt the encrypted document. Following such decryption, printing operation engine 220 is to perform a printing operation to print the document. As used herein, a "printing operation" refers generally to an operation performed by a printer that consumes a marking agent to produce a printed print job or printed content.

In examples, credential sending engine 214 may send the mobile computing device via the first wireless network via a networking protocol. In examples, document receipt engine 218 may receive from the mobile computing device, via the second wireless network, the encrypted document and the encryption key utilizing a networking protocol. In examples the networking protocols utilized may include, but are not limited to, Transmission Control Protocol/Internet Protocol ("TCP/IP"), HyperText Transfer Protocol ("HTTP"), and and/or Session Initiation Protocol ("SIP").

FIG. 2C is a block diagram depicting components of a system 102 to provide for encrypted document printing utilizing multiple networks. In the example of FIG. 2C, system 102 may be hosted by a computer (e.g., but not limited to, a personal computer). In this example, system 102 includes encryption engine 222, mobile computing device connection engine 224, and document sending engine 226. In performing their respective functions, engines 222-226 may access a data repository, e.g., any memory accessible to system 102 that can be used to store and retrieve data.

In an example, encryption engine 222 represents generally a combination of hardware and programming to encrypt a document utilizing an encryption key. In a particular example, the document may be encrypted using an encryption algorithm included within the encryption key, wherein the encryption process generates an image that cannot be read or understood by a human until after decryption with the encryption key.

Document sending engine 226 represents generally a combination of hardware and programming to send the encrypted document and the encryption key to a mobile computing device via a first wireless network. The mobile computing device is to, upon receipt of a user instruction to print the document at a detected printer, communicate with the printer and receive a credential from the printer via a second wireless network.

In particular examples, the user instruction received at the mobile computing device may be an instruction that is initiated by a user interacting with a "print" graphic user interface display, or other graphic user interface display, that is displayed at the mobile computing device at a display component. As used herein, "display" or "displayed" refers generally to exhibition or presentation caused by a computer for the purpose of perception by a user via an electronic display component. In examples, a display may be a display to be presented at a computer monitor, touchscreen, projection device, or other electronic display component. As used herein, a "display component" refers generally to a combination of hardware and programming to exhibit or present content, a message, or other information for perception by a user, and can include, but is not limited to, a visual, tactile or auditory display. In other particular examples, the received user instruction may be a print instruction that is initiated by a user interacting with a physical "print" button, or another physical user interface at the mobile computing device that is not a touchscreen display component.

The mobile computing device is to utilize the credential to communicate with the printer via a third wireless network that has greater bandwidth than the second wireless network. The mobile computing device is to connect to the third wireless network and send the encrypted document and the encryption key to the printer via the third wireless network. The printer, having received the encrypted document and the encryption key, is thus enabled to print the document.

In certain examples, system 102 when hosted at a computer may additionally include a mobile computing device connection engine 224. Mobile computing device connection engine 224 represents generally a combination of hardware and programming to cause the computer to send to the mobile computing device, via a fourth wireless network, a credential for enabling communication between the computer and the mobile computing device via the first wireless network that has a greater bandwidth than does the fourth wireless network. Mobile computing device connection engine 224 is connect to the mobile computing device via the first wireless network, and is to send the encrypted document and the encryption key to the mobile computing device via the first, higher bandwidth, wireless network.

In an example, mobile computing device connection engine 224 may send the encrypted document and the encryption key to the mobile computing device via the first wireless network utilizing a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

With reference back to FIG. 1 in view of FIGS. 2A, 2B, and 2C, in one example system 102 may include a mobile computing services component 230 that includes engines 202-212 operating on a mobile computing device such a client device 106, 108, or 110 (or another device shown or not shown in FIG. 1). In another example, system 102 may include a printing service component 240 that includes engines 214-220 operating on printer 114 (or another printing device shown or not shown in FIG. 1). In another example, system 102 may include a computing services component 250 that includes engines 222-226 operating on any computer such as computing device 104 or client device 106, 108, or 110 (or another computing device shown or not shown in FIG. 1). In other examples, system 102 may include engines 202-212, engines 214-220, and/or engines 222-226 included within, or distributed across, any one or several of computing device 104, client devices 106-110, server device 112, or printer 114.

In the foregoing discussion of FIGS. 2A, 2B, and 2C, engines 202-226 were described as combinations of hardware and programming. Engines 202-226 may be implemented in a number of fashions. Looking at FIGS. 3A, 3B, and 3C the programming may be processor executable instructions stored on a tangible memory resource 330 and the hardware may include a processing resource 340 for executing those instructions. Thus memory resource 330 can be said to store program instructions that when executed by processing resource 340 implement system 102 of FIGS. 2A, 2B, and 2C.

Memory resource 330 represents generally any number of memory components capable of storing instructions that can be executed by processing resource 340. Memory resource 330 is non-transitory in the sense that it does not encompass a transitory signal but instead is made up of more or more memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 102. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

Figure 3A:
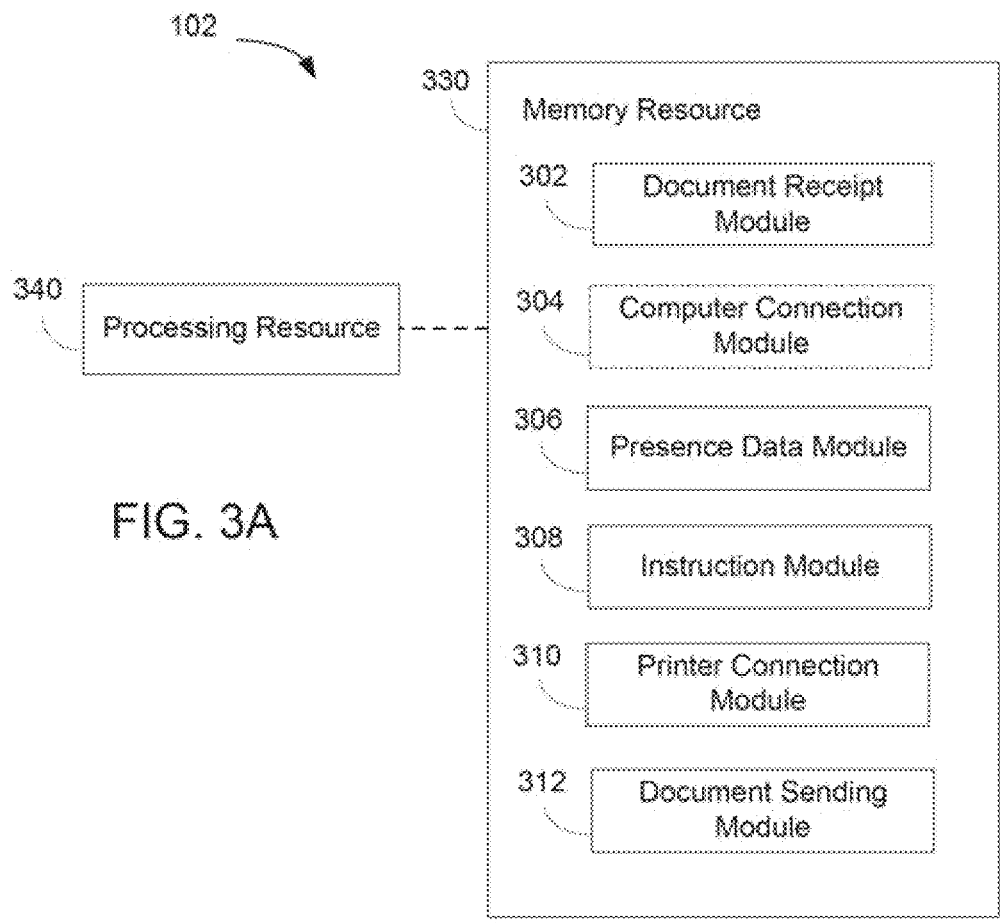

In FIG. 3A, the executable program instructions stored in memory resource 330 are depicted as document receipt module 302, computer connection module 304, presence data module 306, instruction module 308, printer connection module 310, and document sending module 312. Document receipt module 302 represents program instructions that when executed by processing resource 340 may perform any of the functionalities described above in relation to document receipt engine 202 of FIG. 2A. Computer connection module 304 represents program instructions that when executed by processing resource 340 may perform any of the functionalities described above in relation to computer connection engine 204 of FIG. 2A. Presence data module 306 represents program instructions that when executed by processing resource 340 may perform any of the functionalities described above in relation to presence data engine 206 of FIG. 2A. Instruction module 308 represents program instructions that when executed by processing resource 340 may perform any of the functionalities described above in relation to instruction engine 208 of FIG. 2A. Printer connection module 310 represents program instructions that when executed by processing resource 340 may perform any of the functionalities described above in relation to printer connection engine 210 of FIG. 2A. Document sending module 312 represents program instructions that when executed by processing resource 340 may perform any of the functionalities described above in relation to document sending engine 212 of FIG. 2A.

Figure 3B:
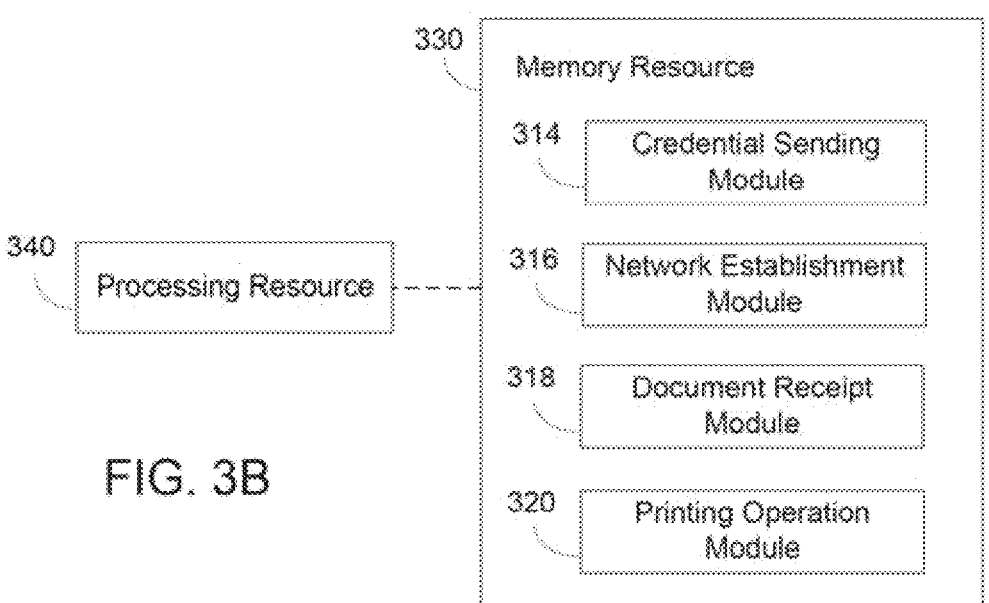

In FIG. 3B, the executable program instructions stored in memory resource 330 are depicted as credential sending module 314, network establishment module 316, document receipt module 318, and printing operation module 320. Credential sending module 314 represents program instructions that when executed by processing resource 340 may perform any of the functionalities described above in relation to credential sending engine 214 of FIG. 2B. Network establishment module 316 represents program instructions that when executed by processing resource 340 may perform any of the functionalities described above in relation to network establishment engine 216 of FIG. 2B. Document receipt module 318 represents program instructions that when executed by processing resource 340 may perform any of the functionalities described above in relation to document receipt engine 218 of FIG. 2B. Printing operation module 320 represents program instructions that when executed by processing resource 340 may perform any of the functionalities described above in relation to printing operation engine 220 of FIG. 2B.

Figure 3C:
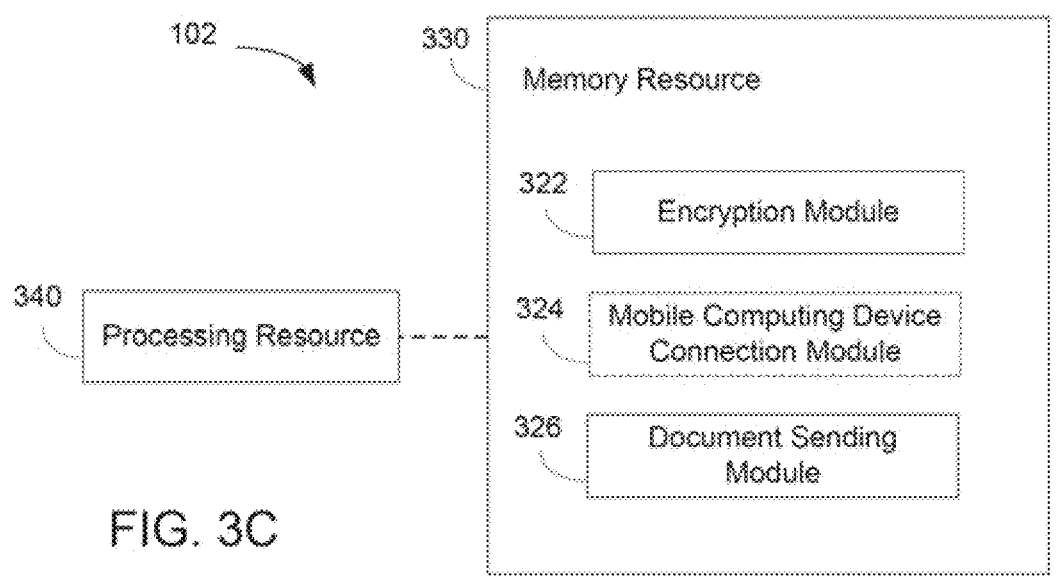
Figure 4:
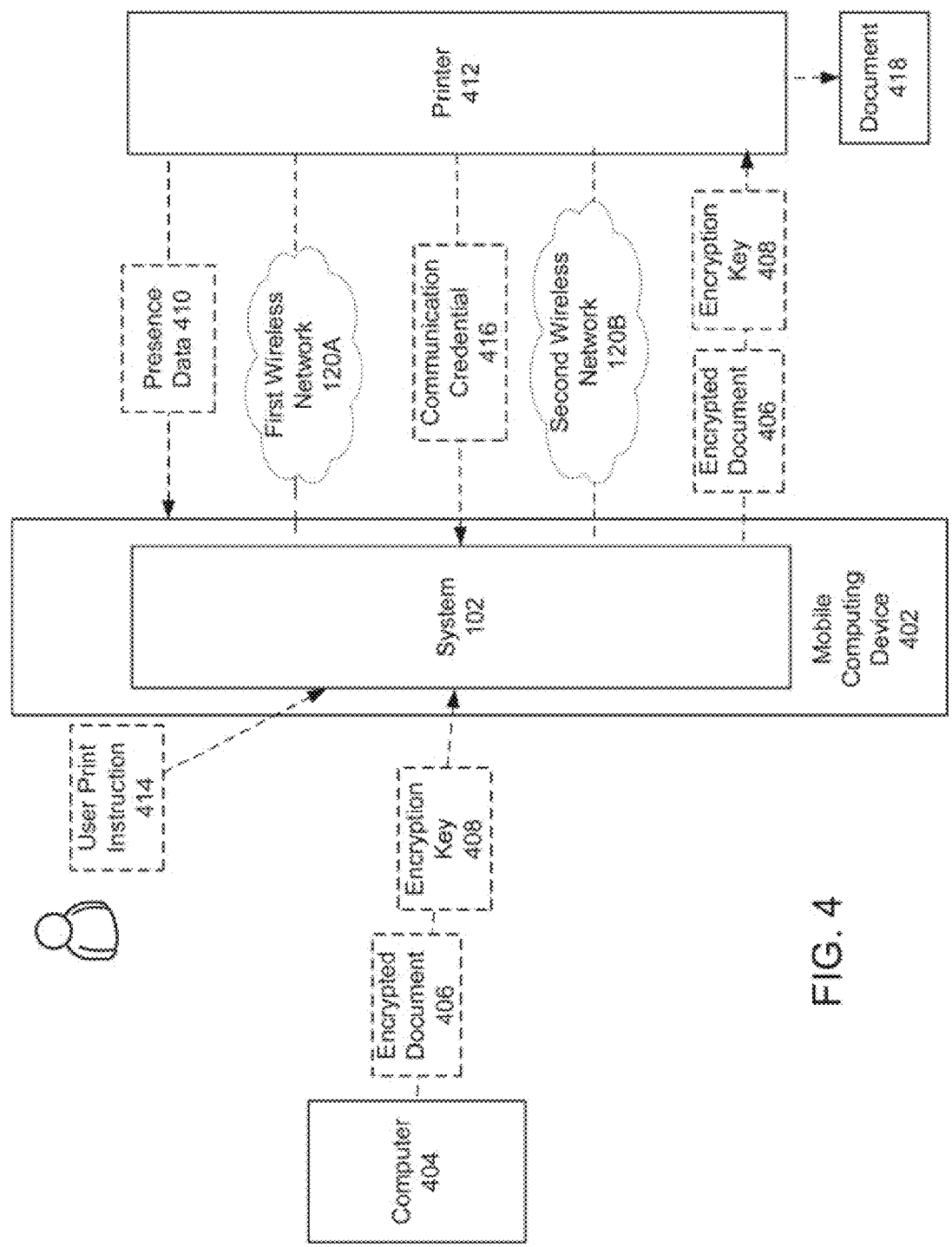
FIGS. 4 and 5 illustrate an example of a system for printing encrypted documents utilizing multiple networks.
Figure 5:
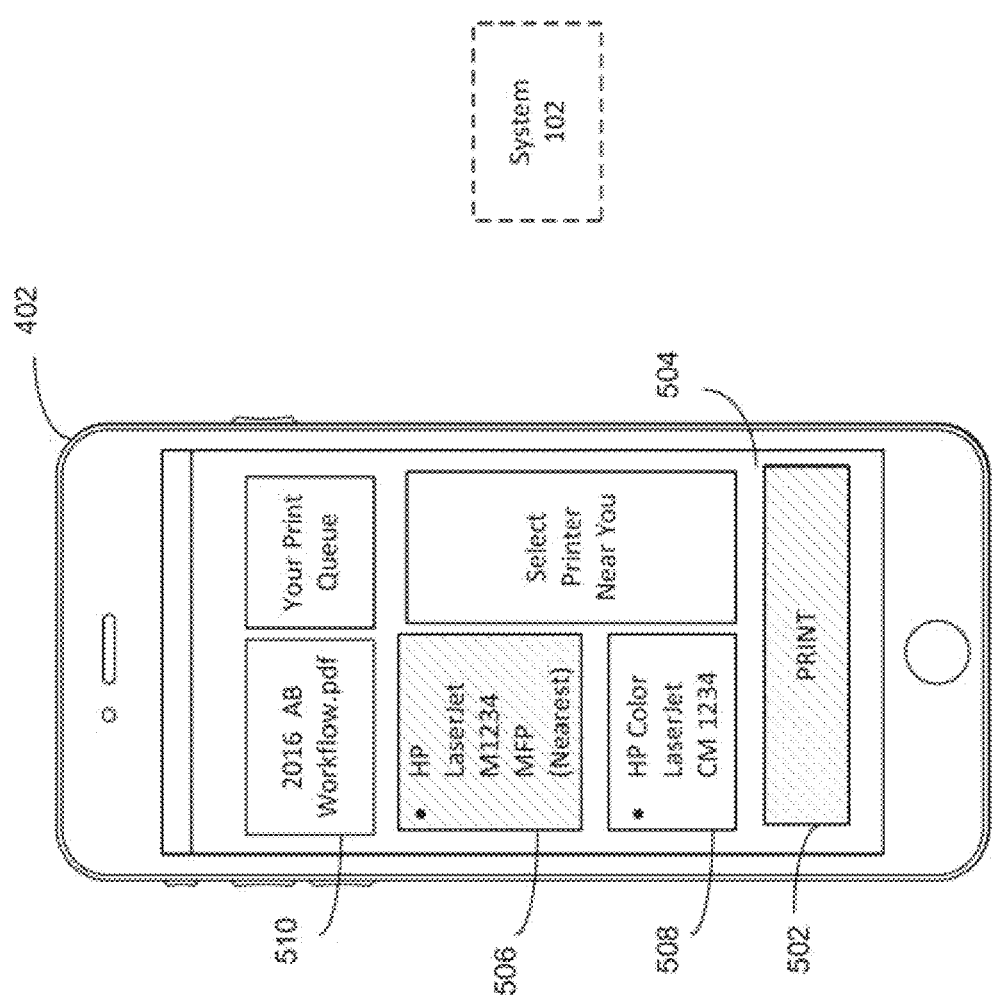

In FIG. 3C, the executable program instructions stored in memory resource 330 are depicted as encryption module 322, mobile computing device connection module 324, and document sending module 326. Encryption module 322 represents program instructions that when executed by processing resource 340 may perform any of the functionalities described above in relation to encryption engine 222 of FIG. 2C. Mobile computing device connection module 324 represents program instructions that when executed by processing resource 340 may perform any of the functionalities described above in relation to mobile computing device connection engine 224 of FIG. 2C. Document sending module 326 represents program instructions that when executed by processing resource 340 may perform any of the functionalities described above in relation to document sending engine 226 of FIG. 2C Illustrative Example:

FIGS. 4 and 5, in view of FIGS. 1, 2A, 2B, and 2C, illustrate an example of implementation of system 102 for printing encrypted documents utilizing multiple networks. In the particular example of FIGS. 4 and 5, system 102 may be hosted at a mobile computing device 402.

Starting at FIG. 4, in this example, system 102 at mobile computing device 402 receives from a computer 404 an encrypted document 406 and an encryption key 408 for decrypting the encrypted document. System 102 receives via a first wireless network 120A that is a Bluetooth wireless network presence data 410 for a printer 412. System 102 receives a user instruction 414 to print the decrypted document 406 at a user-selected printer 412.

Moving to FIG. 5 in view of FIG. 4, in this example, system 102 causes the mobile computing device display component 504 at mobile computing device 402 to display text and/or images informative that system 102 has detected, based on received presence information, two printers: "HP LaserJet M1234 MFP" 506 and "HP Color LaserJet CM 1234" 508. In this example, system 102 causes a display of identifiers for the detected printers "HP LaserJet M1234 MFP" 506 and "HP Color LaserJet CM 1234" 508 at the display component 504 and causes the "HP LaserJet M1234 MFP" 506 printer be indicated as the printer with a highest order of preference. In this example, the order of preference is indicated by the text "Nearest" added to the identifier for "HP LaserJet M1234 MFP" 506. In other examples, the order of preference may be indicated by another descriptive term, e.g., "best", or "closest." In other examples, the order of preference may be expresses as a numerical ranking of the set of printers according to preference. In yet other examples, system 102 may cause the display component 504 to display identifiers for the set of printers, wherein each printer identifier is listed with a determined distance from the mobile computing device to the that printer.

Continuing at FIG. 5 in view of FIG. 4, in this example a user has interacted with the graphic user interface provided at display component 504 of mobile computing device 402 to select the "HP LaserJet M1234 MFP" printer 506 to print the encrypted document "2016 AB Workflow.pdf" 510. Further, in this example, the user has interacted with a "PRINT" graphic user interface 502 that system 102 caused to be displayed at touchscreen display component 504 of mobile computing device 402.

Returning to FIG. 4 in view of FIG. 5, then, in this particular example the user instruction 414 to print the encrypted document "2016 AB Workflow.pdf" 510 (FIG. 5) at the printer "HP LaserJet M1234 MFP" 506 (FIG. 5) is the result of user selection of that printer as the printer of choice and the result of user interaction with the "PRINT" graphic user interface 502 to effect the printing. In other examples, selection of the printer may be automatic based upon a determined preference order, such that the user instruction may be the result of a user interaction with a single graphic user interface icon or a single physical button, including, but not limited to, a "PRINT" icon or button.

Continuing at FIG. 4 in view of FIG. 5, system 102 receives a token or other credential 416 from the selected HP LaserJet M1234 printer via the first wireless network 120A. System 102 is to communicate with the printer 412 using the credential 416 via a second wireless network 120B. In this example an ad hoc Wi-Fi network is established by printer 412. The second wireless network 120B has a greater bandwidth than the first wireless network 120A.

System 102 is to send the encrypted document 406 and the encryption key 408 to the printer 412 over the ad hoc Wi-Fi network. The printer is to in turn utilize the encryption key 408 to decrypt the encrypted document 406 and is to print the document 418 following the decryption.

Figure 6:
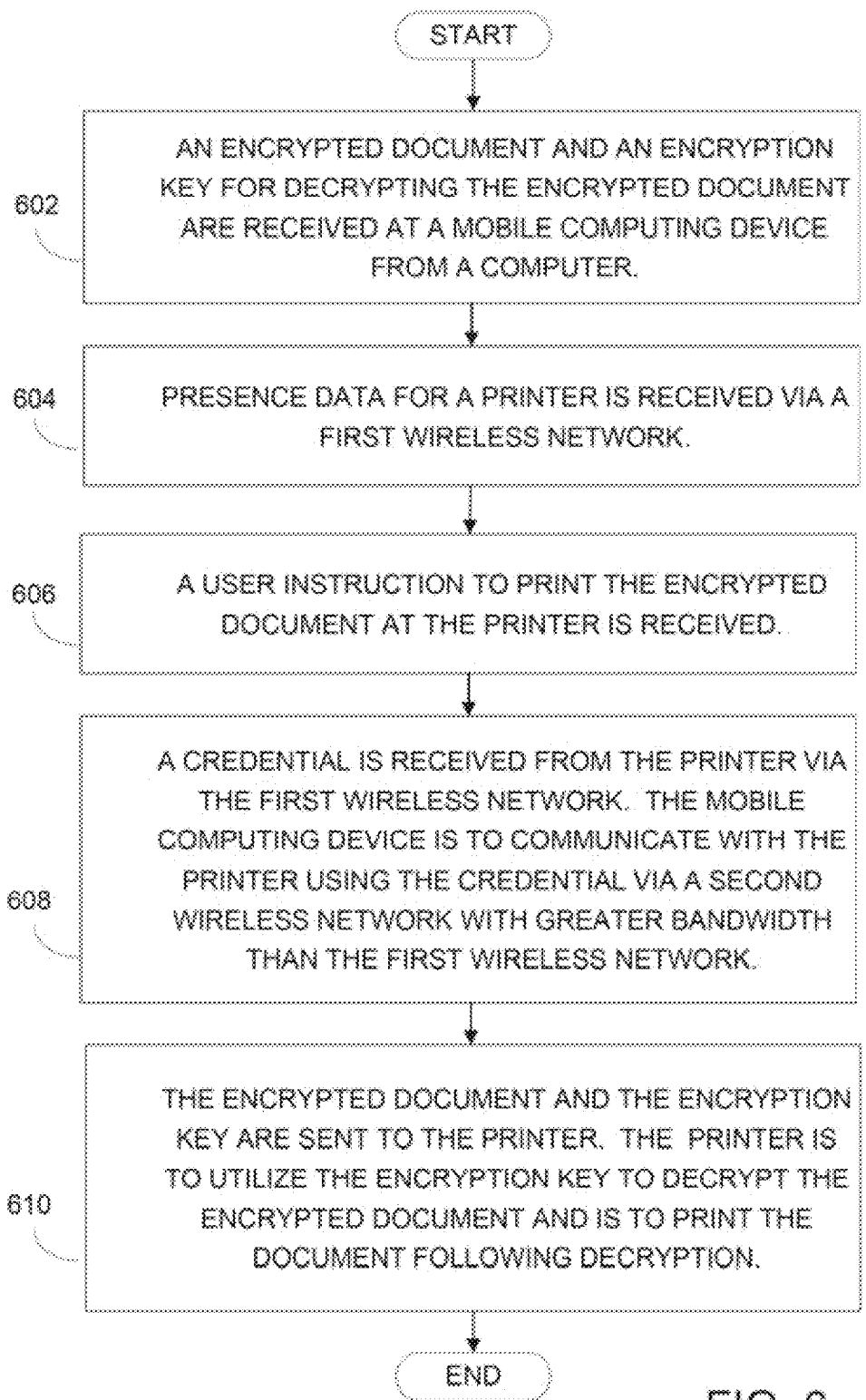
FIG. 6 is a flow diagram depicting implementation of an example of a method to print encrypted documents utilizing multiple networks.

OPERATION: FIG. 6 is a flow diagram of implementation of a method to print encrypted documents utilizing multiple networks. In discussing FIG. 6, reference may be made to the components depicted in FIGS. 2A and 3A. Such reference is made to provide contextual examples and not to limit the manner in which the method depicted by FIG. 6 may be implemented. An encrypted document and an encryption key for decrypting the encrypted document are received at a mobile computing device from a computer (block 602). Referring back to FIGS. 2A and 3A, document receipt engine 202 (FIG. 2A) or document receipt module 302 (FIG. 3A), when executed by processing resource 340, may be responsible for implementing block 602.

Presence data for a printer is received via a first wireless network (block 604). Referring back to FIGS. 2A and 3A, presence data engine 206 (FIG. 2A) or presence data module 306 (FIG. 3A), when executed by processing resource 340, may be responsible for implementing block 604.

A user instruction to print the encrypted document at the printer is received (block 606). Referring back to FIGS. 2A and 3A, instruction engine 208 (FIG. 2A) or instruction module 308 (FIG. 3A), when executed by processing resource 340, may be responsible for implementing block 606.

A credential is received from the printer via the first wireless network. The mobile computing device is to communicate with the printer using the credential via a second wireless network with greater bandwidth than the first wireless network (block 608). Referring back to FIGS. 2A and 3A, printer connection engine 210 (FIG. 2A) or printer connection module 310 (FIG. 3A), when executed by processing resource 340, may be responsible for implementing block 608.

The encrypted document and the encryption key are sent to the printer. The printer is to utilize the encryption key to decrypt the encrypted document and is to print the document following decryption (block 610). Referring back to FIGS. 2A and 3A, document sending engine 212 (FIG. 2A) or document sending module 312 (FIG. 3A), when executed by processing resource 340, may be responsible for implementing block 610.

Figure 7:
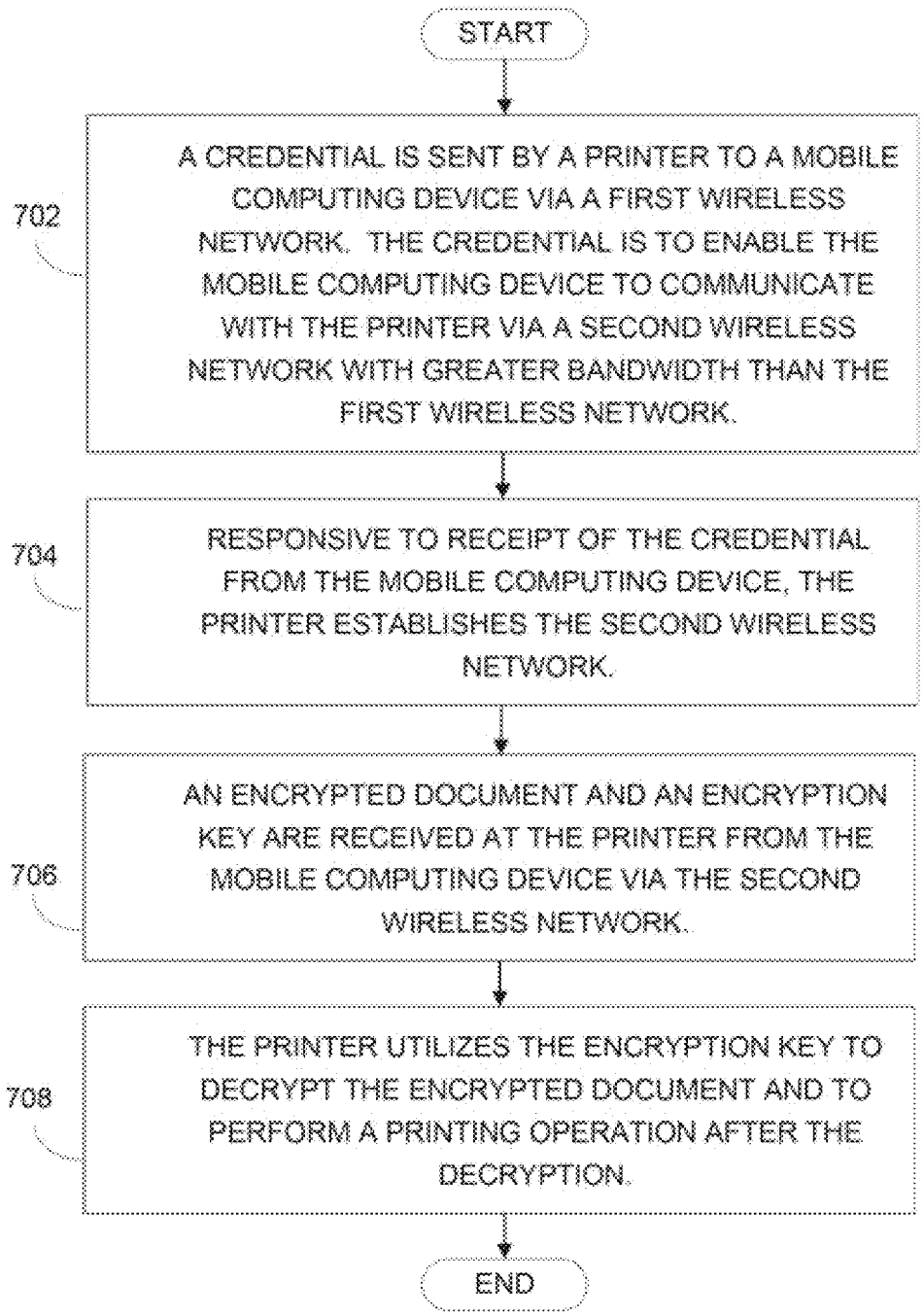
FIG. 7 is a flow diagram depicting implementation of an example of a method to print encrypted documents utilizing multiple networks, including establishing a second wireless network for receiving an encrypted document and an encryption key, utilizing the encryption key to decrypt the encrypted document, and performing a printing operation following the decryption.

FIG. 7 is a flow diagram of implementation of a method to print encrypted documents utilizing multiple networks, including establishing a second wireless network for receiving an encrypted document and an encryption key, utilizing the encryption key to decrypt the encrypted document, and performing a printing operation following the decryption. In discussing FIG. 7, reference may be made to the components depicted in FIGS. 2B and 3B. Such reference is made to provide contextual examples and not to limit the manner in which the method depicted by FIG. 7 may be implemented. A credential is sent by a printer to a mobile computing device via a first wireless network. The credential is to enable the mobile computing device to communicate with the printer via a second wireless network with greater bandwidth than the first wireless network (block 702). Referring back to FIGS. 2B and 3B, credential sending engine 214 (FIG. 2B) or credential sending module 314 (FIG. 3B), when executed by processing resource 340, may be responsible for implementing block 702.

Responsive to receipt of the credential from the mobile computing device, the printer establishes the second wireless network (block 704). Referring back to FIGS. 2B and 3B, network establishment engine 216 (FIG. 2B) or network establishment module 316 (FIG. 3B), when executed by processing resource 340, may be responsible for implementing block 704.

An encrypted document and an encryption key are received at the printer from the mobile computing device via the second wireless network (block 706). Referring back to FIGS. 2B and 3B, document receipt engine 218 (FIG. 2B) or document receipt module 318 (FIG. 3B), when executed by processing resource 340, may be responsible for implementing block 706.

The printer utilizes the encryption key to decrypt the encrypted document and to perform a printing operation after the decryption (block 708). Referring back to FIGS. 2B and 3B, printing operation engine 220 (FIG. 2B) or printing operation module 320 (FIG. 3B), when executed by processing resource 340, may be responsible for implementing block 708.

Figure 8:
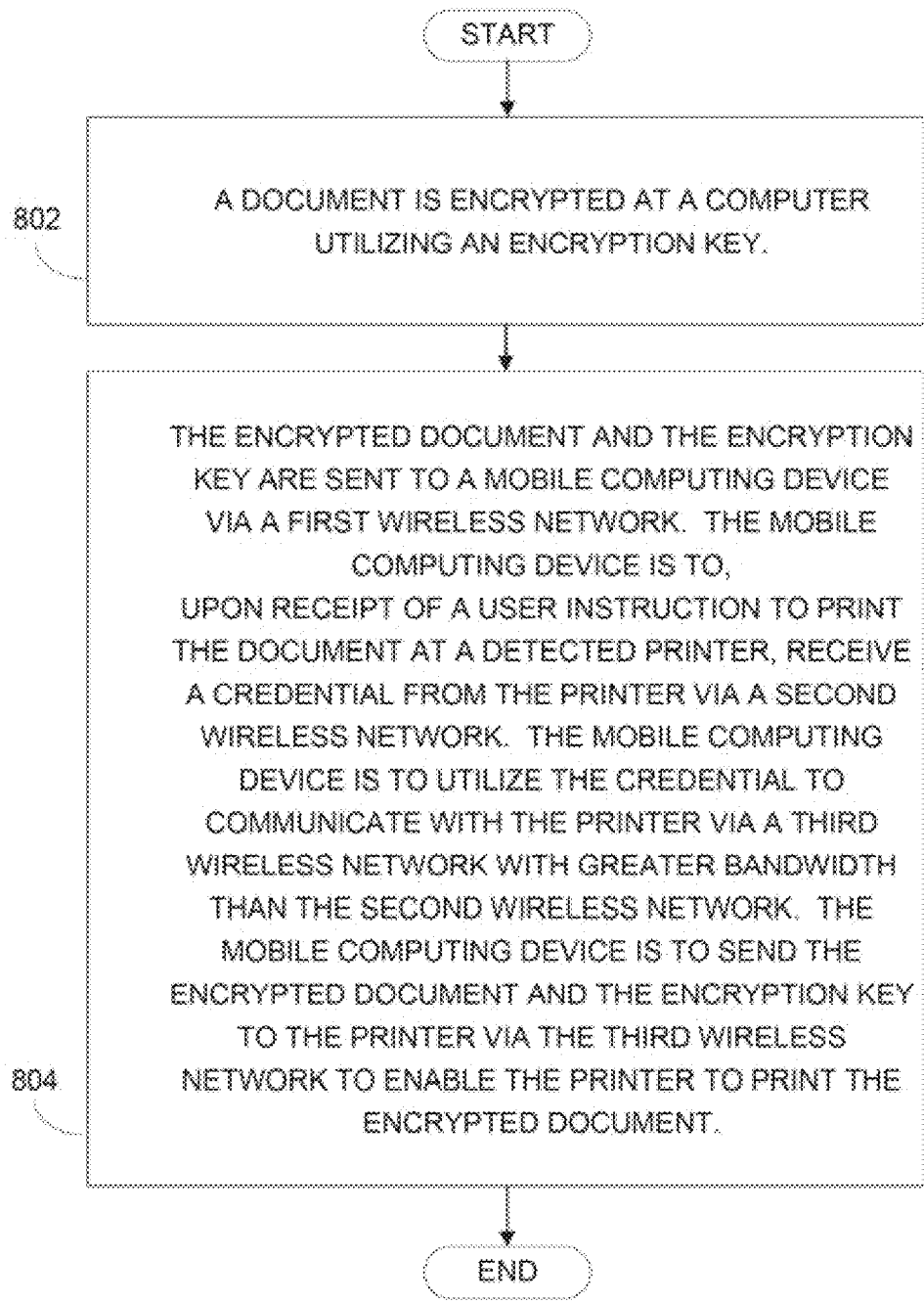
FIG. 8 is a flow diagram depicting implementation of an example of a method to print encrypted documents utilizing multiple networks, including encrypting a document utilizing an encryption key and sending the encrypted document and the encryption key to a mobile computing device.

FIG. 8 is a flow diagram of implementation of a method to print encrypted documents utilizing multiple networks, including encrypting a document utilizing an encryption key and sending the encrypted document and the encryption key to a mobile computing device. In discussing FIG. 8, reference may be made to the components depicted in FIGS. 2C and 3C. Such reference is made to provide contextual examples and not to limit the manner in which the method depicted by FIG. 8 may be implemented. A document is encrypted at a computer utilizing an encryption key (802). Referring back to FIGS. 2C and 3C, encryption engine 222 (FIG. 2C) or encryption module 322 (FIG. 3C), when executed by processing resource 340, may be responsible for implementing block 802.

The encrypted document and the encryption key are sent to a mobile computing device via a first wireless network. The mobile computing device is to, upon receipt of a user instruction to print the document at a detected printer, communicate with the printer and receive a credential from the printer via a second wireless network. The mobile computing device is to utilize the credential to communicate with the printer via a third wireless network with greater bandwidth than the second wireless network. The mobile computing device is to send the encrypted document and the encryption key to the printer via the third wireless network to enable the printer to print the encrypted document (block 804). Referring back to FIGS. 2C and 3C, document sending engine 226 (FIG. 2C) or document sending module 326 (FIG. 3C), when executed by processing resource 340, may be responsible for implementing block 804.

CONCLUSION

FIGS. 1-8 aid in depicting the architecture, functionality, and operation of various examples. In particular, FIGS. 1, 2A, 2B, 2C, 3A, 3B, and 3C depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6-8 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A mobile computing device, comprising:
   a processor; and
   a non-transitory storage medium storing instructions executable on the processor to:
   receive, from a computer via a first wireless network, an encrypted document and an encryption key for decrypting the encrypted document;
   receive, via a second wireless network, presence data for a printer;
   receive a user instruction to print the encrypted document at the printer;
   receive a credential from the printer via the second wireless network;
   communicate with the printer using the credential via a third wireless network with greater bandwidth than the second wireless network; and
   send the encrypted document and the encryption key to the printer via the third wireless network, wherein the printer is to utilize the encryption key to decrypt the encrypted document and is to print the document following decryption.

2. The mobile computing device of claim 1, wherein the second wireless network is selected from among a Bluetooth wireless network, a near field communication wireless network, or an infrared wireless network.

3. The mobile computing device of claim 1, wherein the third wireless network comprises an ad hoc Wi-Fi network.

4. The mobile computing device of claim 1, wherein the printer is a first printer, and wherein the instructions are executable on the processor to determine and present a preference order for a set of printers that includes the first printer, the preference order determined based at least in part upon the presence data.

5. The mobile computing device of claim 4, wherein the instructions are executable on the processor to determine the preference order based at least in part upon wireless signal strengths associated with the printers of the set of printers.

6. The mobile computing device of claim 4, wherein the instructions are executable on the processor to determine the preference order based at least in part upon a proximity between the mobile computing device and the first printer.

7. The mobile computing device of claim 1, wherein the mobile computing device comprises a smartphone or a wearable computing device.

8. The mobile computing device of claim 1, wherein the encryption key is useable to decrypt the encrypted document for a designated time period.

9. The mobile computing device of claim 1, wherein the instructions are executable on the processor to:
receive a credential from a computer via a fourth wireless network; and
communicate, using the credential from the computer, with the computer via the first wireless network with greater bandwidth than the fourth wireless network.

10. The mobile computing device of claim 1, wherein the presence data comprises data sent by the printer as part of a pinging operation.

11. A non-transitory machine-readable storage medium storing instructions that when executed cause a mobile computing device to:
receive, from a computer via a first wireless network, an encrypted document and an encryption key for decrypting the encrypted document;
receive, via a second wireless network, presence data for a printer;
receive a user instruction to print the encrypted document at the printer;
receive a credential from the printer via the second wireless network; and
communicate with the printer using the credential via a third wireless network with greater bandwidth than the second wireless network; and
send the encrypted document and the encryption key to the printer via the third wireless network, wherein the printer is to utilize the encryption key to decrypt the encrypted document and is to print the document following decryption.

12. The non-transitory machine-readable storage medium of claim 11, wherein the second wireless network is selected from among a Bluetooth wireless network, a near field communication wireless network, or an infrared wireless network, and wherein the third wireless network comprises an ad hoc Wi-Fi network.

13. The non-transitory machine-readable storage medium of claim 11, wherein the encryption key is useable by the printer to decrypt the encrypted document during a designated time period.

14. The non-transitory machine-readable storage medium of claim 11, wherein the printer is a first printer, and wherein the instructions upon execution cause the mobile computing device to determine and present a preference order for a set of printers that includes the first printer, the preference order determined based at least in part upon the presence data.

15. The non-transitory machine-readable storage medium of claim 14, wherein the instructions upon execution cause the mobile computing device to determine the preference order based at least in part upon wireless signal strengths associated with the printers of the set of printers.

16. The non-transitory machine-readable storage medium of claim 14, wherein the instructions upon execution cause the mobile computing device to determine the preference order based at least in part upon proximities between the mobile computing device and the printers of the set of printers.

17. The non-transitory machine-readable storage medium of claim 11, wherein the presence data comprises data sent by the printer as part of a pinging operation.

18. A method for secure printing, comprising:
encrypting a document utilizing an encryption key; and
sending the encrypted document and the encryption key to a mobile computing device via a first wireless network, wherein the mobile computing device is to
upon receipt of a user instruction to print the document at a detected printer, communicate with the printer and receive a credential from the printer via a second wireless network, wherein the mobile computing device is to
communicate with the printer via a third wireless network with greater bandwidth than the second wireless network and send the encrypted document and the encryption key to the printer via the third wireless network to enable the printer to print the encrypted document.

19. The method of claim 18, further comprising sending, to the mobile computing device via a fourth wireless network, a credential for communicating with the mobile computing device via the first wireless network with greater bandwidth than the fourth wireless network, and connecting to the mobile computing device via the first wireless network.

20. The method of claim 18, wherein the encrypting and the sending of the encrypted document are performed by a computer.

* * * * *